April 13, 1965        C. M. CHRISTY        3,178,026

POROUS FLOOR STRUCTURE AND SEALING MEANS THEREFOR

Filed Dec. 22, 1961        2 Sheets-Sheet 1

INVENTOR:
CALVIN M. CHRISTY

BY Gravely, Lieder & Woodruff
ATTORNEYS

April 13, 1965   C. M. CHRISTY   3,178,026
POROUS FLOOR STRUCTURE AND SEALING MEANS THEREFOR
Filed Dec. 22, 1961   2 Sheets-Sheet 2
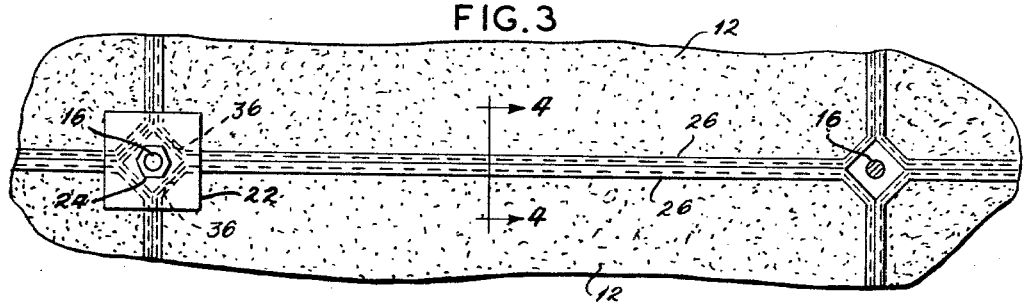
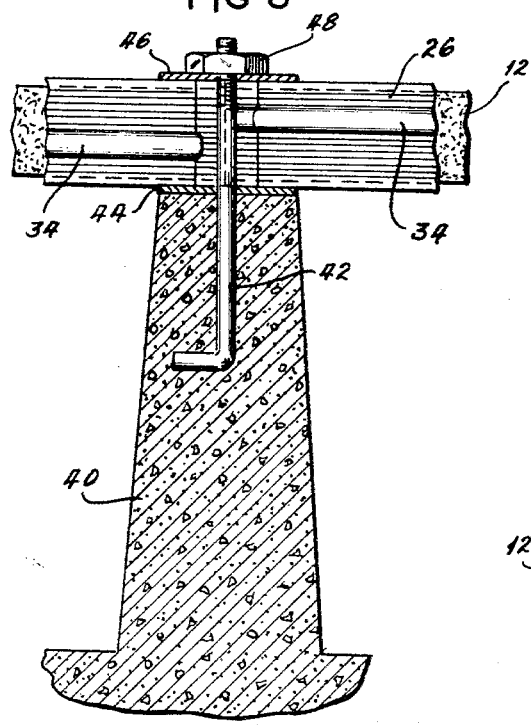
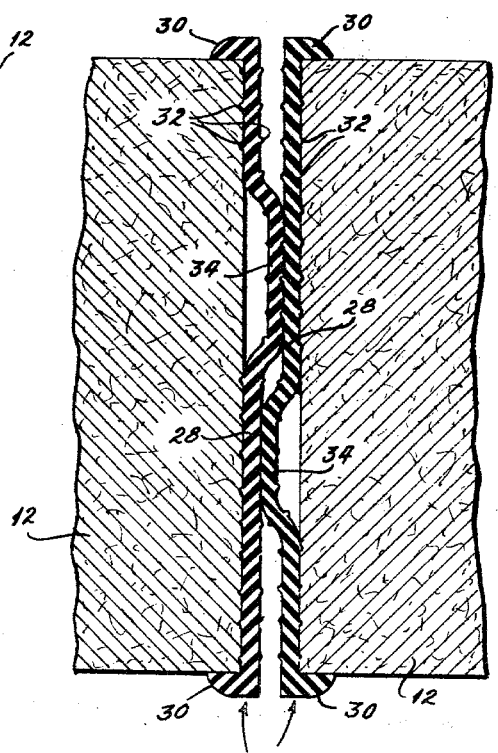
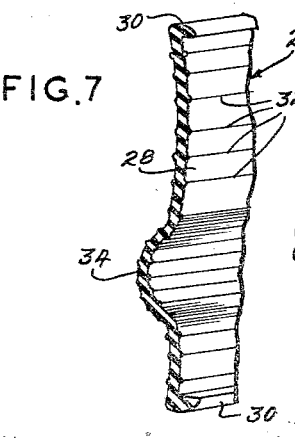
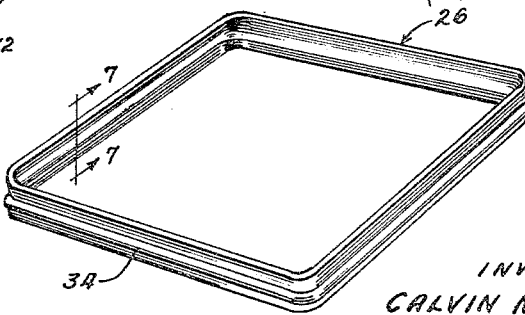
INVENTOR:
CALVIN M. CHRISTY
BY Gravely, Lieder & Woodruff
ATTORNEYS.

United States Patent Office 3,178,026
Patented Apr. 13, 1965

3,178,026
POROUS FLOOR STRUCTURE AND SEALING
MEANS THEREFOR
Calvin M. Christy, St. Louis, Mo., assignor to Christy
Fire Brick Company, St. Louis, Mo., a corporation of
Missouri
Filed Dec. 22, 1961, Ser. No. 161,456
10 Claims. (Cl. 210—293)

The present invention relates generally to porous structures and more particularly to a porous floor structure for use in filtration and drainage systems and the like, and to sealing means for such structures.

Porous structures such as the floors of filtration systems and the like have been known and used for a long time. Many of the known structures are constructed of a plurality of individual porous panels positioned in edge-to-edge relation and supported in an elevated position above another floor on suitable support members. The spaces between the individual panels are usually sealed by tar, cement or some other grouting material to prevent undesirable leakage therebetween, and all of the known means of sealing have been relatively difficult, expensive and time consuming to apply and all known grouting or sealing substances are subject to deterioration such as cracking and breaking and therefore require frequent repair and maintenance. Many of the known grouting substances also require heat in their application and this has caused damage to the panels and has made application in close quarters unpleasant and unhealthy for the persons involved. For these and other reasons known porous floor structures and the sealing means employed therefor have been unsatisfactory.

These and other disadvantages and short comings of the known structures and sealing means therefor are overcome by the present invention which comprises a structure formed by individual porous panels and which includes novel and improved means for supporting and for sealing between adjacent panels. More specifically the present invention comprises a porous structure constructed of a plurality of individual porous panel members positioned in edge-to-edge relation, means for supporting said structure in spaced relationship above a base structure, and means for sealing between the edges of adjacent panels including a continuous flexible gasket positioned extending around the peripheral edges of preselected ones of said panels to seal between the edges of adjacent panels, said gaskets having a length equal approximately to the periphery of the panels and including a central portion having a width approximately equal to the thickness of the associated panels, and marginal edge portions integral with the central portion along each side edge thereof, said flanges extending substantially perpendicular to the plane of the central portion for cooperatively engaging the opposite surfaces of the associated panel adjacent to the side edges thereof, a portion of the central portion of the gaskets also being formed to extend outwardly from the plane thereof so as to press against an adjacent panel or gasket and form a seal therewith. The subject invention also resides in the provision of continuous beaded portions formed on the surfaces of the gasket to prevent slippage thereof on an adjacent surface.

It is a principal object of the present invention to provide an improved porous structure for filtration and other types of drainage systems.

Another object is to provide improved means for sealing between adjacent panels in a porous structure.

Another object is to provide relatively inexpensive and relatively easy to install and repair sealing means for porous structures and the like.

Another object is to provide sealing means for sealing between adjacent panel members which are not subject to crumbling, breaking, slipping and other forms of deterioration and wear, and which are also not subject to coming loose or leaking.

Another object is to provide means for sealing between panel members in filtration systems and the like which are not subject to coming loose or leaking due to back flushing of the system.

Another object is to provide improved means for sealing a porous structure to support means therefor, and also for sealing between said structure and a surrounding wall.

These and other objects and advantages of the present invention will become apparent after considering the following detailed specification which describes several preferred embodiments of the invention in conjunction with the accompanying drawings, wherein:

FIG. 3 is an enlarged fragmentary plan view of a portion of the porous structure of FIG. 1 as seen looking downwardly thereon;

FIG. 4 is an enlarged fragmentary cross sectional view taken on line 4—4 of FIG. 3;

FIG. 6 is an enlarged perspective view of a sealing gasket per se;

FIG. 7 is a fragmentary cross-sectional view of the sealing gasket of FIG. 6 taken along line 7—7 therein; and FIG. 8 is a fragmentary cross-sectional view showing a modified form of support means for a porous floor structure.

Figure 1:
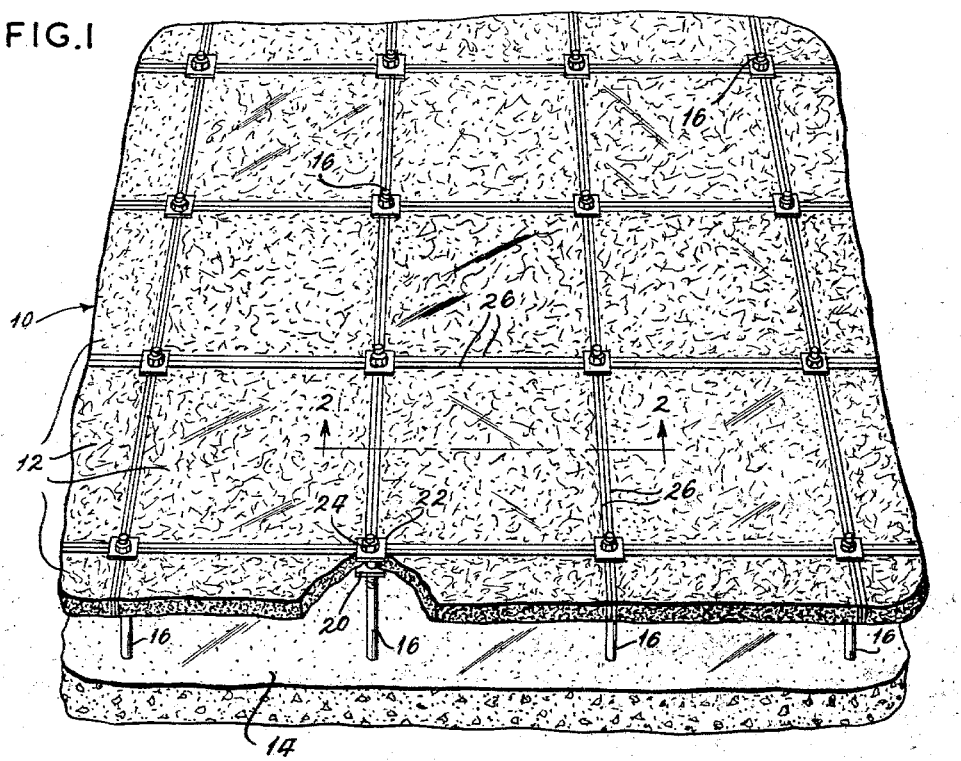
FIG. 1 is a fragmentary perspective view of a portion of a porous floor structure in a filtration system constructed according to the present invention.

Referring to the drawings by reference number, number 10 refers to a porous floor structure for a filtration system or the like according to the present invention. The structure 10 is formed by a plurality of individual porous panels 12 which are supported in an elevated position above a base structure such as a concrete floor 14 on a plurality of support members each of which includes a threaded rod 16, a nut 18, washers 20 and 22, and another nut 24. Each of the panels 12, which makes up the porous floor 10 is similar to the panel shown in FIG. 5, and each of the panels 12 is provided with a continuous flexible gasket 26 which extends around the peripheral edges thereof. In the structures shown in the drawings all of the panels are provided with gaskets 26 thereareound. In many situations, however, it may not be necessary or even desirable for space and other reasons to have gaskets around all the panels. It is usually desirable, however, to have at least one gasket 26 positioned between each two adjacent panel side edges in order to provide a well sealed floor structure.

The construction to the gaskets 26 is important to the invention and makes the installation and repair of a porous floor relatively simple and inexpensive. In the past, porous floors have been formed of individual porous panels, and the spaces between adjacent panels has been filled with some suitable grouting material such as tar, cement or asphalt. This was done to prevent leakage between adjacent panels and also to prevent loss of the filtration medium through the spaces between the panels. All forms of sealing or grouting material employed heretofore, however, have been subject to cracking, crumbling and other forms of deterioration, and for these and other reasons have required relatively frequent, costly, and time consuming repair and maintenance. Furthermore, all of the known grouting materials have been relatively difficult and time consuming to install and have required heating devices as well as mixing or stirring equipment. Still further most porous floors are installed in relatively close and confining quarters where the heat required for melting the tar or other grouting material and the dampness are such as to be unhealthy for workers to be in. With the present structure using the gaskets 26, however, installation of the porous floors can be accomplished without using any heating or mixing equipment and can be performed with simple hand tools using relatively unskilled labor. In addition the sealing provided by the gaskets 26 is not subject to cracking, crumbling and other forms of deterioration, and is relatively easy to install, repair and maintain in the event that the structure becomes damaged for some reason.

The structural details of the gaskets 26 are clearly shown in FIGS. 4, 6 and 7. Each gasket 26 includes a central portion 28 which is approximately as wide as the panels are thick, and each gasket 26 also has an integral beaded portion 30 along each side edge thereof. The beaded portions 30 extend substantially perpendicular to the central portion 28 and cooperate with the upper and lower surfaces of the panel 12 as shown in FIG. 4 to hold the gaskets in place and to improve the sealing action thereof. The central portions 28 of the gaskets 26 also have continuous ribbing 32 on one or both opposite surfaces thereof to prevent slippage between adjacent gaskets or between a gasket and any other surface in contact therewith. The central portions 28 of the gaskets 26 are also formed with outwardly bulging portions 34 which are preferably located closer to one side edge of the gaskets than the other. The bulges 34 are provided for sealing purposes and bulges on gaskets on adjacent panels are positioned in staggered relation as shown in FIG. 4 to provide a double seal therebetween. The gaskets 26 are preferably formed of a flexible plastic or plastic like material which is relatively incompressible, although in some situations it is recognized that a certain limited amount of compressibility may be desirable.

Figure 5:
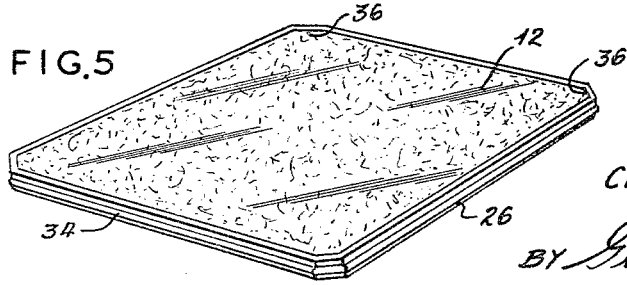
FIG. 5 is an enlarged perspective view of a single panel of a floor structure equipped with a sealing gasket constructed according to the present invention.

The corners of the panels 12 are bevelled at 36 as shown in FIGS. 3 and 5 so that space is provided at the juncture of each four panels through which the supporting rods 16 can extend. During installation of the floor 10, the lower nuts 18 are located on their respective support rods 16 at the proper elevation as determined by a leveling tool (not shown) so that the floor 10 will be level. The lower washers 20 are then positioned on the rods 16, and thereafter the panels 12, with gaskets 26 installed, are positioned on the supports as shown in FIG. 1. As the floor is installed and the panels around each rod 16 are set in position, the upper washers 22 are positioned on the rods 16 above the panels 12 and tightened down by the turning down on the upper nuts 24. When the nuts 24 are tightened the washers 20 and 22 press against the beaded portions 30 of the gaskets 26 on opposite sides of the panels and form a seal therewith around the corners of the panels 12 and around the rods 16. If desired, a second nut or lock washer can also be included with one or both nuts 18 and 24.

After the floor has been constructed the space thereabove is filled with sand or some other suitable filtration material and the filtration system is then ready to be placed in operation. During operation water enters through an inlet near the top of the system (not shown) and passes down through the sand, through the porous floor 10 into the space therebelow and then flows out through an outlet pipe (not shown). Every so often the filtration system needs to be flushed to get rid of dirt and other foreign matter that has accumulated on the sand. Flushing is accomplished by forcing water upwardly through the porous floor and the sand and out an overflow tube (not shown) near the top. With the present floor structure neither the normal downward drainage through the floor or the back flushing adversely affects the sealing means between adjacent panels. It should also be noted that the pressure of the water in the filter, especially during backwashing, keeps the bulges 34 inflated thereby assuring a double seal in the joint between adjacent panels. In actual practice, however, the panels are usually snugged up tight causing the bulges to flatten out, but the tendency of course remains for the bulges to inflate.

Figure 2:
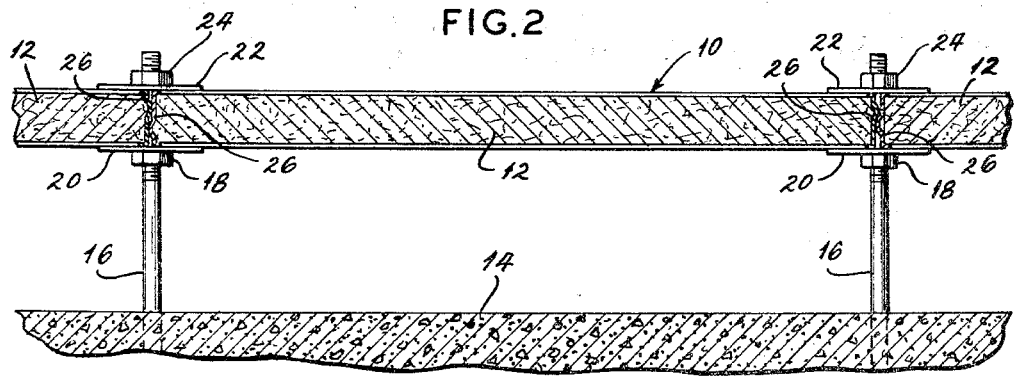
FIG. 2 is a fragmentary cross-sectional view taken on line 2—2 of FIG. 1.

In FIG. 8 there is shown a modified form of the device wherein the support means for the porous floor includes a plurality of concrete piers 40 which extend upwardly to adjacent the lower surface of the floor. The concrete piers have rods 42 embedded in them, and the rods extend upwardly from the top of the piers 40 and washers 44 and 46 and a nut 48 are mounted on the rods. Except for the fact that the modified construction has concrete piers instead of rods that extend down to the bottom of the tank as in the structure of FIGS. 1 and 2, the modified structure is similar to the structure 10 and employs similar gasket means for sealing between adjacent panels.

Thus there has been shown and described novel means for constructing porous floors for filtration and other drainage systems, and novel means for sealing between porous panels of such systems, which floor structure and sealing means fulfill all of the objects and advantages sought therefor. It is anticipated, however, that many changes, variations, modifications and alterations of the present structure will become apparent to those skilled in the art after considering this specification and the accompanying drawings. All such changes, variations, modifications and alterations which do not depart from the spirit and scope of the invention are deemed covered by the invention which is limited only by the claims which follow.

What is claimed is:

1. A floor for a filtration system or the like comprising a plurality of individual porous panels having upper and lower surfaces and side walls extending around the peripheries thereof; inert flexible and relatively incompressible sealing members mounted on said panels and extending around the peripheral side walls of said panels, each of said sealing members being a continuous member having a central portion of approximately the same width as the thickness of the panels, said central portion having opposite surfaces and opposite side edges, and an integral flange extending along each side edge thereof, said flanges extending from the central portion substantially perpendicular thereto for engaging the upper and lower surfaces of its respective panel; and means for supporting said panels in adjacent coplanar relationship to form a floor, the sealing members on said panels cooperatively engaging said upper and lower surfaces of said panels to form a seal therewith and cooperatively engaging other sealing members on adjacent panels.

2. The floor defined in claim 1 wherein each of said sealing members having surface ribs on said central portion for sealing purposes and to prevent movement thereof when installed.

3. The floor defined in claim 2 wherein the central portions of said sealing members having continuous outwardly extending bulges formed intermediate the sides thereof for sealing purposes.

4. A snap-on sealing gasket for a porous filtration panel comprising a continuous member formed of flexible and relatively incompressible and inert plastic material, said gasket having a continuous central wall portion adapted to extend around the periprery of and conform to the shape of said panel said central portion having a width substantially equal to the thickness of said panel, and integral marginal holding flanges formed on the opposite edges of said continuous wall portion and extending substantially at right angles from said wall portion.

5. The gasket defined in claim 4 wherein said continuous wall portion has an outwardly extending bulging portion along the length thereof intermediate the edge flanges, said bulging portion being spaced closer to one of said edge flanges than the other.

6. The gasket defined in claim 4 wherein said wall portion has opposite side surfaces each of which is provided with a plurality of integral ribs extending along the length thereof.

7. In a floor for a filtration tank or the like having a bottom wall, and a plurality of upwardly extending floor support members attached to the bottom wall, the improvement of a porous floor structure mounted above the bottom wall, said porous floor structure including a plurality of coplanar porous panels having upper and lower surfaces and side walls extending therebetween around the peripheries, flexible sealing members of continuous strip form positioned on the peripheries of said panels and being of such length as to extend around the peripheral side walls thereof, said sealing members having central portions substantially the width of said panels, portions on said sealing members extending outwardly from the associated panels for sealably engaging surfaces on adjacent panels brought in contact therewith, each of said sealing members consisting of a relatively incompressible plastic material substantially inert to water and water borne chemicals in the filtration tank, integral beads on the opposite edges of said sealing members for engaging the opposite upper and lower panel surfaces of the associated panels to retain said sealing members against displacement under filter flow and back washing action, said beads also cooperatively engaging the floor support members to seal between the panels.

8. In a floor for a filtration system subject to back washing by being spaced from the bottom wall of a filtration tank, the improvement with porous floor panels arranged in coplanar relationship and in which each panel has an upper surface exposed to filtration media a lower surface spaced from the bottom of the filtration tank and peripheral edges related in adjacency with other panel edges and forming joints in the floor, of sealing means for the floor joints comprising a plurality of preformed endless strips of flexible material associated with certain of said panels, each of said strips having a central portion embracing the edges of its respective panel and marginal beads integral with and carried by said central portion to snap over the edges and engage on the upper and lower surfaces of the respective panel and hold said central portion in position, said central portion being formed with an off-set portion bulging outwardly relative to the panel edge on which said sealing means is carried and forming a collapsible wall for filling floor joints of variable widths.

9. The improvement set forth in claim 8, wherein said sealing means is snapped on adjacent ones of said floor panels to provide seal to seal engagement in the floor joints, each seal means having a plurality of gripping ribs on both surfaces of said central portion to increase the ability of said sealing means and marginal beads to hold the same on the panels.

10. The improvement set forth in claim 9, wherein each of said sealing means has its off-set bulging portion located off-center of the panel edges, and said panels are set into the floor in alternate positions, whereby said bulging portions are related in overlapped relation in the floor joints, said gripping ribs on each sealing means engaging the opposed sealing means in the floor joints, whereby said sealing means cooperate in retaining the joints closed.

References Cited by the Examiner

UNITED STATES PATENTS

| | | | |
|---|---|---|---|
| Re. 23,009 | 6/48 | Camp | 210—293 |
| 2,043,734 | 6/36 | Camp | 210—510 |
| 2,170,637 | 8/39 | Hatch et al. | 50—346 X |
| 2,661,229 | 12/53 | Slaughter | 277—211 |
| 2,716,490 | 8/55 | Barstow | 210—293 X |
| 3,032,062 | 5/62 | Blahnik | 277—211 X |

REUBEN FRIEDMAN, *Primary Examiner.*

HERBERT L. MARTIN, *Examiner.*